(12) United States Patent
Krebill et al.

(10) Patent No.: US 11,548,079 B2
(45) Date of Patent: Jan. 10, 2023

(54) RUPTURE DISC HAVING STRESS CONCENTRATING FEATURE

(71) Applicant: Fike Corporation, Blue Springs, MO (US)

(72) Inventors: Michael D. Krebill, Lee's Summit, MO (US); Donald Ray Hibler, III, Leawood, KS (US); Travis Johnson, Independence, MO (US)

(73) Assignee: Fike Corporation, Blue Springs, MO (US)

( * ) Notice: Subject to any disclaimer, the term of this patent is extended or adjusted under 35 U.S.C. 154(b) by 0 days.

(21) Appl. No.: 16/502,139

(22) Filed: Jul. 3, 2019

(65) Prior Publication Data

US 2020/0009666 A1 Jan. 9, 2020

Related U.S. Application Data

(60) Provisional application No. 62/694,235, filed on Jul. 5, 2018.

(51) Int. Cl.
*B23C 3/34* (2006.01)
*F16K 17/16* (2006.01)
(Continued)

(52) U.S. Cl.
CPC .............. *B23C 3/34* (2013.01); *B23K 26/359* (2015.10); *B23K 26/364* (2015.10); *F16K 17/162* (2013.01); *E21B 34/063* (2013.01)

(58) Field of Classification Search
CPC ...... F16K 17/1606; F16K 17/16; F16K 17/40; Y10T 137/1729; Y10T 137/1744;
(Continued)

(56) References Cited

U.S. PATENT DOCUMENTS 3,989,057 A * 11/1976 Muddiman ......... F16K 17/1626
137/68.24
4,072,160 A 2/1978 Hansen
(Continued)

FOREIGN PATENT DOCUMENTS

EP 0556512 8/1993
JP 10-508674 8/1998
(Continued)

OTHER PUBLICATIONS

International Search Report and Written Opinion in corresponding PCT/US2019/040451, dated Oct. 24, 2019.
(Continued)

*Primary Examiner* — Shawn M Braden
(74) *Attorney, Agent, or Firm* — Hovey Williams LLP

(57) ABSTRACT

A bulged, forward-acting rupture disc (10) and a pressure relief device (38) incorporating a rupture disc (10), having a line of opening (28) formed in the transition region (26) of the disc between the bulged section (12) and flange section (14) are provided. The line of opening (28) is a stress-concentrating feature that, in conjunction with a stress-intensifying edge (68) located on an associated outlet ring (42), facilitates opening of the disc (10) when exposed to a predetermined pressure acting upon the concave face (20) of the bulged section (12).

20 Claims, 8 Drawing Sheets

(51) Int. Cl.
  *B23K 26/364* (2014.01)
  *B23K 26/359* (2014.01)
  *E21B 34/06* (2006.01)

(58) Field of Classification Search
  CPC ......... Y10T 137/1699; Y10T 137/1722; Y10T 137/1692; Y10T 137/1752
  See application file for complete search history.

(56) References Cited

U.S. PATENT DOCUMENTS

| | | | |
|---|---|---|---|
| 4,079,854 A | 3/1978 | Shaw et al. | |
| 4,580,691 A | 4/1986 | Hansen | |
| 4,655,070 A | 4/1987 | Clift | |
| 4,759,460 A | 7/1988 | Mozley | |
| 4,809,729 A * | 3/1989 | Muddiman | F16K 17/16 137/68.24 |
| 5,050,630 A * | 9/1991 | Farwell | F16K 17/162 137/68.25 |
| 5,558,114 A | 9/1996 | Strelow | |
| 5,934,308 A * | 8/1999 | Farwell | F16K 17/16 137/68.26 |
| 6,178,983 B1 * | 1/2001 | Culliinane | F16K 17/1606 137/68.26 |
| 6,321,582 B1 | 11/2001 | Cullinane et al. | |
| 6,378,544 B1 * | 4/2002 | DiBello | F16K 17/16 137/68.25 |
| 6,446,653 B2 * | 9/2002 | Cullinane | F16K 17/1606 137/68.25 |
| 6,672,389 B1 | 1/2004 | Hinrichs | |
| 6,959,828 B2 | 11/2005 | Eijkelenberg et al. | |
| 9,303,778 B2 | 4/2016 | Walker | |
| 9,551,429 B2 | 1/2017 | Walker et al. | |
| 10,109,831 B2 * | 10/2018 | Kotik | H01M 2/1072 |
| 2001/0052358 A1 | 12/2001 | Cullinane et al. | |
| 2002/0108750 A1 | 8/2002 | Friend et al. | |
| 2009/0302035 A1 | 12/2009 | Shaw et al. | |
| 2010/0140238 A1 | 6/2010 | Mozley et al. | |
| 2010/0258200 A1 * | 10/2010 | Walker | F16K 17/1613 137/68.25 |
| 2012/0000548 A1 * | 1/2012 | Khamitkar | F16K 17/1606 137/68.25 |
| 2013/0056085 A1 * | 3/2013 | Tomasko | F16K 17/1606 137/14 |
| 2014/0116531 A1 | 5/2014 | Walker et al. | |
| 2015/0300513 A1 * | 10/2015 | Smets | F16K 17/16 137/68.25 |
| 2017/0130853 A1 * | 5/2017 | Wilson | F16K 17/1613 |
| 2017/0307095 A1 * | 10/2017 | Wilson | F16K 15/181 |
| 2018/0051819 A1 * | 2/2018 | Pittel | F16K 17/16 |

FOREIGN PATENT DOCUMENTS

| | | |
|---|---|---|
| KR | 10-1248442 | 4/2013 |
| KR | 10-2015-0087013 | 7/2015 |
| WO | 2019075255 | 4/2019 |
| WO | 2020010172 | 1/2020 |

OTHER PUBLICATIONS

Examination Report in corresponding Saudi Patent Application Serial No. 520420929, dated Feb. 10, 2022.
Examination Report in corresponding Indian Patent Application Serial No. 202017055854, dated Apr. 3, 2022.
Search Report in corresponding European Patent Application Serial No. 19830267.1, dated Mar. 2, 2022.
Office Action in corresponding Chinese Patent Application Serial No. 201980044758.6, dated Mar. 22, 2022.

* cited by examiner

RUPTURE DISC HAVING STRESS CONCENTRATING FEATURE

CROSS-REFERENCE TO RELATED APPLICATION

This application claims the benefit of U.S. Provisional Patent Application No. 62/694,235, filed Jul. 5, 2018, which is incorporated by reference herein in its entirety.

BACKGROUND OF THE INVENTION

Field of the Invention

The present invention is generally directed toward a bulged, forward-acting rupture disc, and a pressure relief device incorporating a rupture disc having a line of opening formed in the transition region of the disc between the bulged section and flange section. The line of opening serves as a stress-concentrating feature that facilitates opening of the disc when exposed to a predetermined pressure acting upon the concave face of the bulged section.

Description of the Prior Art

Rupture discs, and pressure relief device assemblies in general, are used in many applications. In addition to safety applications in which rupture discs are used to protect equipment from an untoward over- or under-pressure condition, rupture discs can be used to control fluid flow within an environment, such as a well. In some downhole applications, after the rupture disc has served its purpose in isolating a portion of a tubing string or otherwise controlling the flow of a fluid, the disc is opened so as to permit the free flow of fluid within the wellbore. In certain of these applications, there is a need to create a large opening in the rupture disc that is at least as a great as the narrowest adjoining portion of the tool string so as not to restrict passage of fluid or other tools through the bore.

Lines of opening are often formed in rupture discs so as to define an area within which the disc material will tear upon exposure to a predetermined fluid pressure. Conventionally, in bulged rupture discs, these lines of opening are formed within the bulged section itself. To a lesser extent, the line of opening can also be formed in the flat, annular flange of the disc. Forming a line of opening within the transition region of the disc, namely the region at which the bulged section interfaces with the flange, has heretofore been avoided. The transition region is often an area of the rupture disc of lessened structural integrity because of the stresses introduced as a result of the bulging of the disc. Accordingly, further weakening of this area by creating a line of opening, either through scoring of the disc or through removal of disc material, will affect the burst characteristics of the disc. Forming the line of opening in the bulged section is generally preferred because such can be done in a manner that minimizes the effect on the disc's burst pressure characteristics. However, the tradeoff for this is that the opening through the disc will typically be of a smaller diameter than the bore of the tool or tubing in which the disc is installed.

One particular downhole application in which rupture discs are used is the running of casing into a wellbore. In certain horizontal or highly deviated well bores, unconventional techniques may be employed to reduce drag between the casing string and the formation so as to prevent exceeding the load capacity of the casing hook. In practicing these techniques, tools are typically installed within the casing string that comprise rupture discs so as to prevent flow of fluid through the casing until desired, such as during cementing operations.

As fluids and/or additional tools may be run into the casing during implementation of this technique, it is important that tools used do not impede the flow of fluid within the casing or impair fracture plug deployment during plug-and-perf operations. Therefore, there exists a need in the art for a pressure relief device comprising a rupture disc that is capable of opening without leaving remnants of the rupture disc or rupture disc petal that will impede or otherwise restrict the flow of fluid and/or downhole tools following placement of the casing.

SUMMARY OF THE INVENTION

According to one embodiment of the present invention there is provided a bulged, forward-acting rupture disc. The rupture disc comprises a central bulged section comprising a concavo-convex dome, a flat, annular flange section surrounding the central bulged section, a transition region that is intermediate to and interconnects the central bulged section and the flange section, and a line of opening that overlies the transition region. The line of opening comprises an area in which material making up the rupture disc has been removed thereby weakening the rupture disc such that when a pressure of a fluid acting upon a concave face of the dome reaches a predetermined threshold the rupture disc tears along the line of opening thereby providing an opening through the disc that has a diameter that is at least as large as an internal diameter of the flange section.

According to another embodiment of the present invention there is provided a pressure relief device comprising a bulged, forward-acting rupture disc that is secured between an inlet ring and an outlet ring. The rupture disc comprises a central bulged section comprising a concavo-convex dome, a flat, annular flange section surrounding the central bulged section, a transition region that is intermediate to and interconnects the central bulged section and the flange section, and a line of opening that overlies the transition region. The inlet ring is configured to abut the side of the rupture disc comprising a concave face of the dome. The outlet ring is configured to abut the side of the rupture disc comprising a convex face of the dome and has an internal diameter D. The rupture disc, when exposed to a fluid of a predetermined pressure acting against the concave face of the dome, tears along the line of opening thereby providing an opening through the disc that has a diameter that is at least as large as D.

According to still another embodiment of the present invention there is provided a method of manufacturing a rupture disc formed from a disc material. The method comprises removing disc material from a transition region of a bulged, forward-acting rupture disc to form a line of opening that overlies the transition region. The transition region is intermediate to and interconnects a central bulged section and a flat, annular flange section that surrounds the central bulged section.

Figure 1:
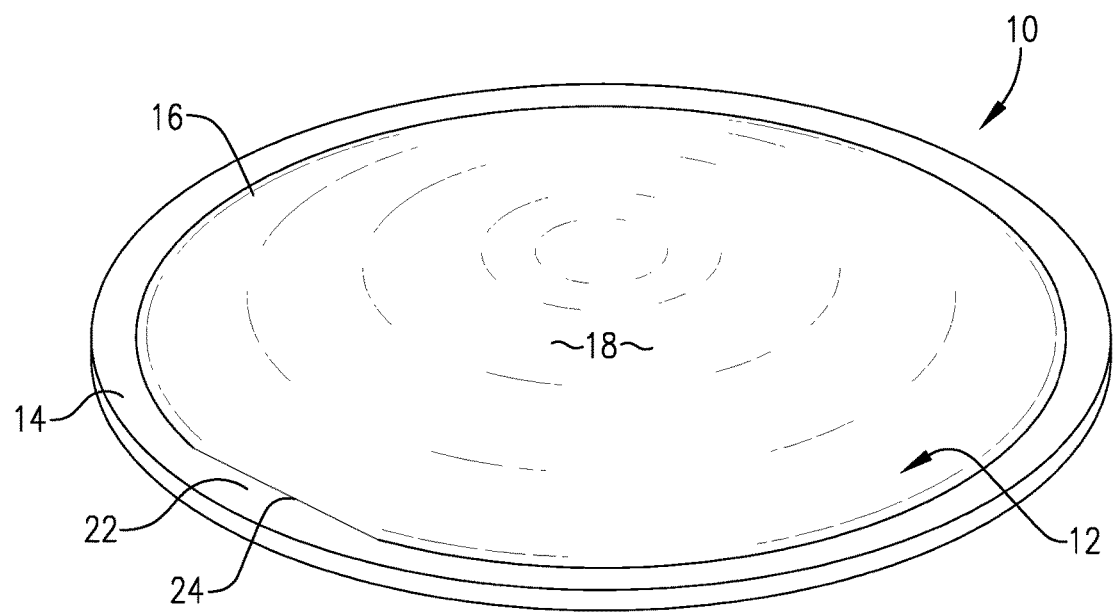
FIG. 1 is a perspective view of the convex face of a rupture disc in accordance with the present invention.

While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENT

Figure 2:
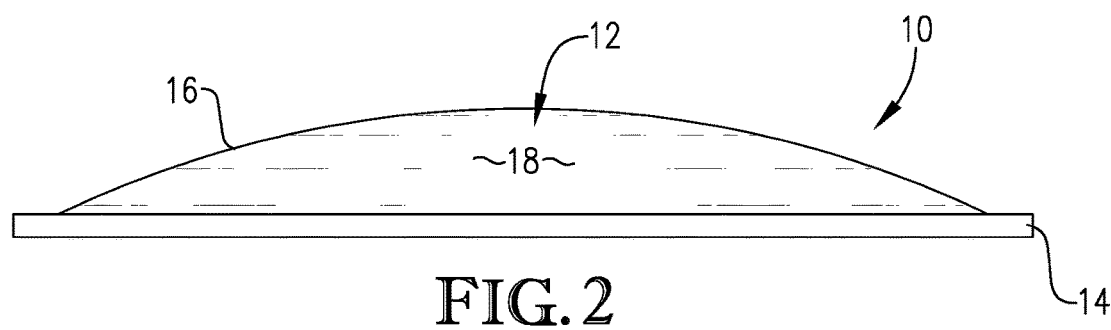
FIG. 2 is a side elevation view of the rupture disc of FIG. 1.
Figure 3:
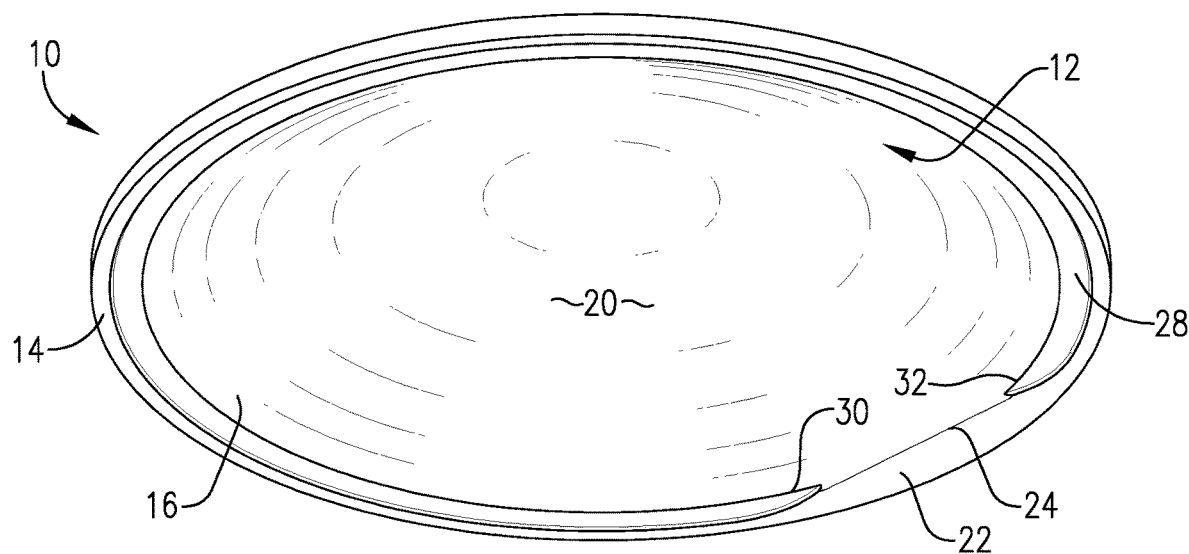
FIG. 3 is a perspective view of the concave face of the rupture disc of FIG. 1.

Turning now to FIGS. 1-3, a rupture disc 10 made in accordance with an embodiment of the present invention is illustrated. In preferred embodiments, rupture disc 10 is metallic and may be formed from any number of metals and alloys, especially alloys that are corrosion resistant. Rupture disc 10 generally comprises a bulged central section 12 that is surrounded by a flat, annular flange section 14. Bulged section 12 generally comprises a concavo-convex dome 16 having a convex face 18 and a concave face 20 (see, FIG. 3). In certain embodiments, and as can be seen from FIG. 1, the dome 16 may be non-concentric insofar as the dome 16 is not symmetrical (and consequently, nor is flange section 14). Disc 10 is formed with a hinge section 22 having a rectilinear margin 24 where the flange section 14 and the bulged section 12 intersect. The hinge section 22 is described in further detail below.

Figure 7:
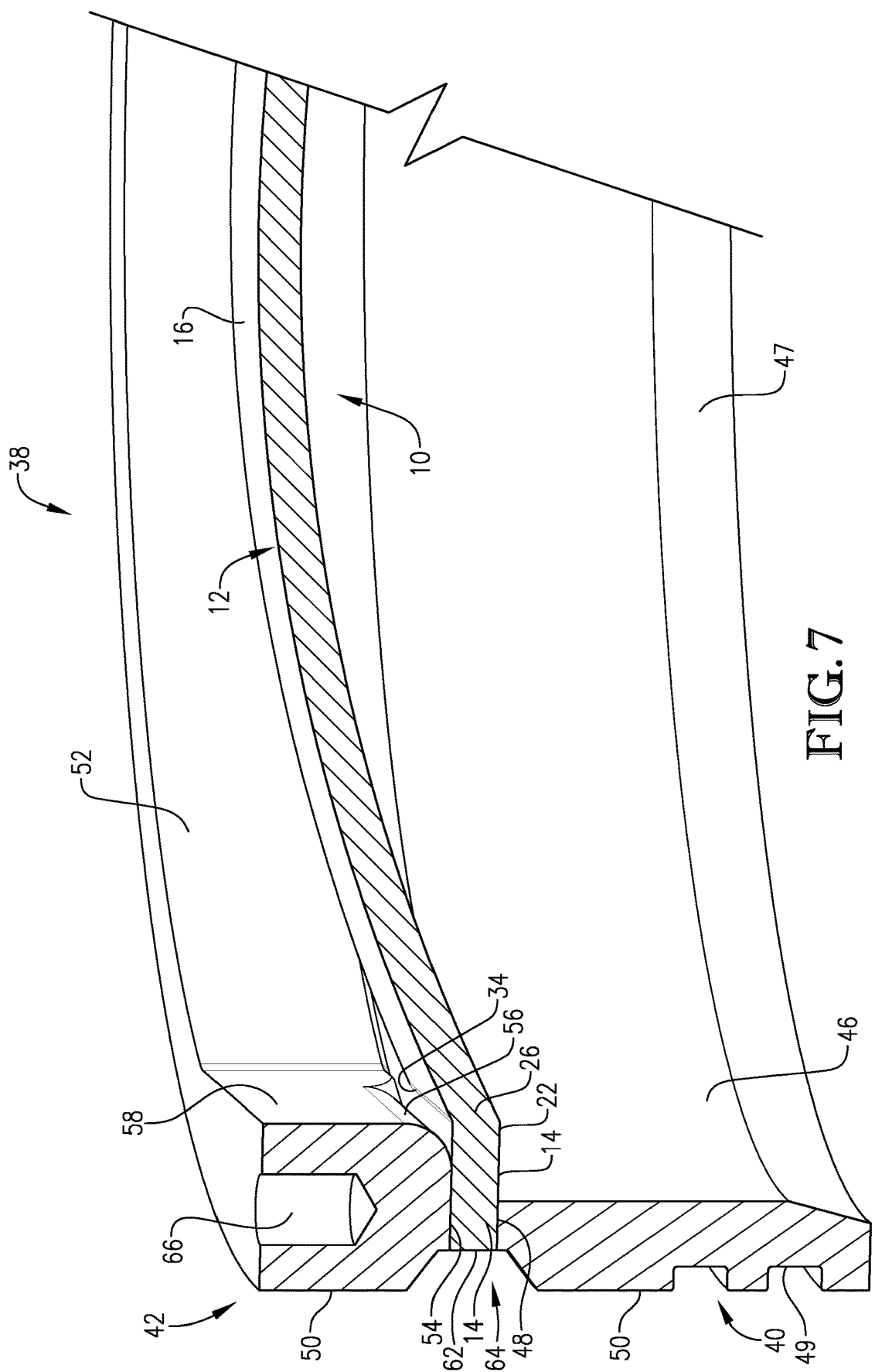
FIG. 7 is close-up, sectioned view of the pressure relief device of FIG. 4 illustrating the transition region of the rupture disc from the convex face perspective.
Figure 8:
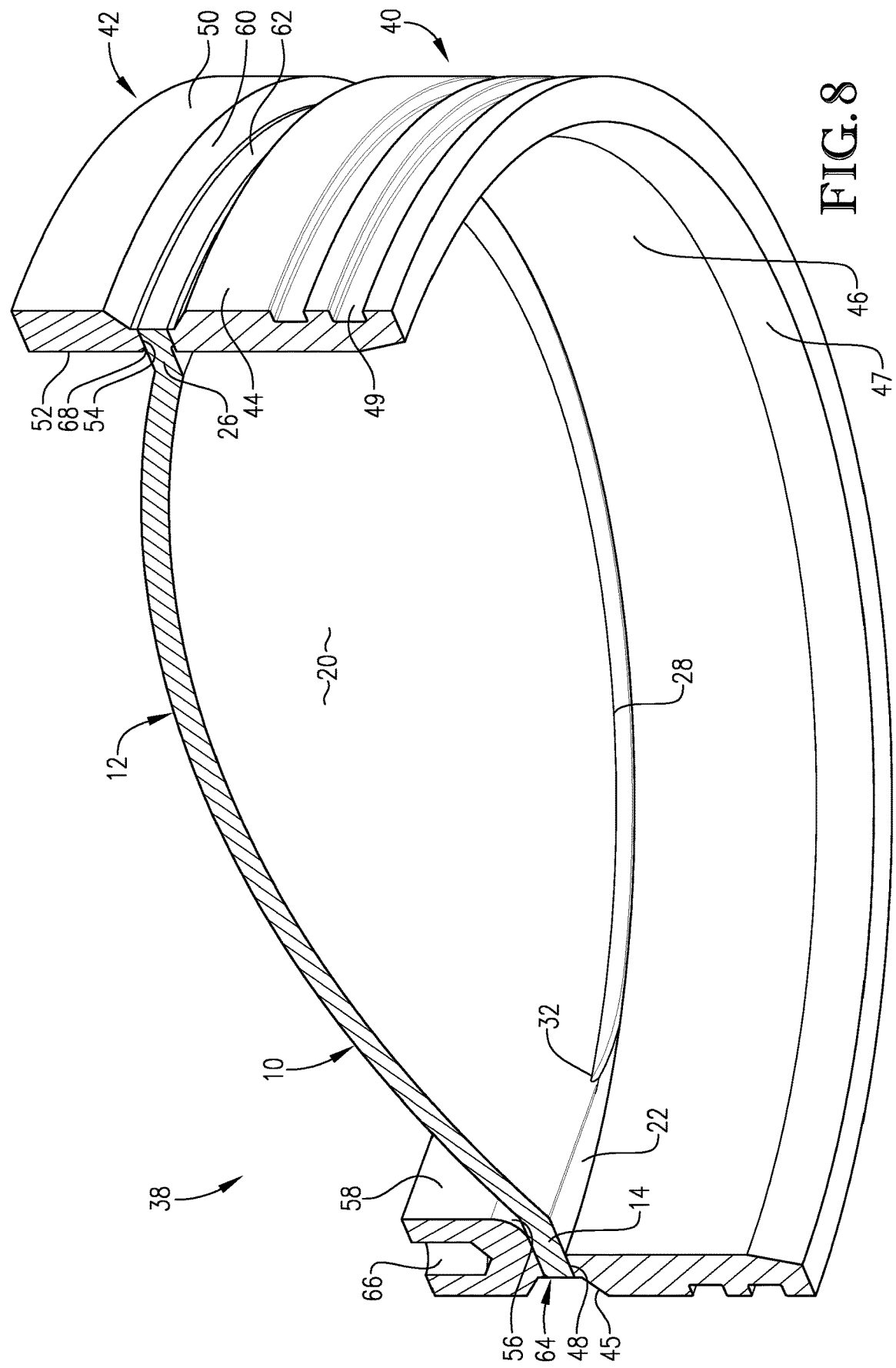
FIG. 8 is a perspective, cross-sectioned view of the pressure relief device of FIG. 4 illustrating the concave face of the rupture disc and line of opening formed therein.

As best shown in FIG. 7, disc 10 further comprises a transition region 26 that is intermediate to and interconnects the central bulged section 12 and the flange section 14. The transition region 26 also defines an inner diameter for annular flange section 14. As can be seen in FIG. 3, disc 10 further comprises a line of opening 28 that is formed in the transition region 26. The line of opening 28 generally overlies the transition region 26. As used herein, the term "transition region" refers to the portion of a rupture disc that is located in between and interconnects the central bulged section 12 and the annular flange section 14. As the name implies, the transition region 26 is that area of the disc in which the flat, annular flange section 14 transitions into the dome-shaped central bulged section. In certain embodiments, the profile of the concave surface of the central bulged section 12 has a second derivative that is nearly constant. The flange section 14 of the of the disc 10 is flat, a profile that has both a first and second derivative equal to zero. Thus, in particular embodiments, the transition region 26 is the region having a profile where the first and second derivatives deviate radially from zero at the inner diameter of the annular flange section 14 to that of the central bulged section's concavo-convex dome 16.

In certain embodiments, manufacturing of rupture disc 10 involves first providing a flat disc blank, which is essentially a thin, circular piece of metal. The disc blank is then clamped within a forming tool, the clamped area of the disc being what will become the annular flange section 14. Next, a high-pressure fluid, such as air, is introduced into the forming tool on one side of the disc blank. The high-pressure fluid deforms the central, unsecured portion of the disc into what will become the bulged section 12. This deformation, which begins immediately inboard of the margins of the clamps securing the flange section 14 and presents itself as a shearing action, introduces stress into the disc material resulting in the formation of the transition region 26. From a metallurgical standpoint, the shear stress manifests itself as an area in which the grain structure of the metal making up the rupture disc has been altered relative to at least the flange section 14 and/or the bulged section 12. It is noted that due to the bulging operation, the bulged section 12 may also have an altered grain structure relative to the flange section. However, the stress introduced to the bulged section 12 during bulging of the disc is generally less than the stress introduced into the transition region 26. Moreover, the stress in the transition region 26 is greater than the stress introduced into any other part of the disc 10 during the bulging operation. In certain embodiments, the metal grains may appear flattened or elongated relative to the grains of the flange section 14 and/or bulged section 12. The precise lateral margins of the transition region 26 may be difficult to identify; however, the upper and lower margins of the transition region 26 are generally indicated by the presence of creases 34, 36, one of which being on the same side of rupture disc 10 as convex face 18, and the other of which being on the same side of rupture disc 10 as concave face 20. (See, FIGS. 7 and 9.)

In certain embodiments the entire length of the line of opening 28, namely from one end of the line of opening 28 to the opposite end, overlies the transition region 26. In particular embodiments, the line of opening 28 is C-shaped as opposed to other patterns, such as a cross-score pattern or a pattern of intersecting lines. Accordingly, when disc 10 opens along line of opening 28, a single disc petal which comprises the central bulged section 12 is formed. This is in contrast to a cross-score line of opening configuration which would result in the formation of multiple petals upon disc opening. In certain embodiments, the line of opening 28 comprises an area in which material making up the rupture disc 10 has been removed thereby weakening the rupture disc so as to permit tearing of the disc along the line of opening upon exposure to a predetermined fluid pressure acting upon the dome 16 of the disc. As noted previously, the tearing of the disc 10 along the line of opening 28 results in the formation of a single petal.

The petal formed upon opening of the rupture disc remains attached to flange section 14 by way of hinge section 22. As seen in FIG. 3, the line of opening comprises two ends 30, 32. These ends generally define the side margins of hinge section 22, demarking an area in which no material making up the rupture disc has been removed from the transition region. In preferred embodiments, tearing of the disc 10 upon opening terminates at ends 30, 32. During opening of the disc 10, the petal formed from the central bulged section 12 pivots about hinge section 22 thereby providing an opening in the disc through which fluid may pass. In certain embodiments, because line of opening 28 is formed in transition region 26 and not further inboard so that the entirety of line of opening 28 would be located in the bulged section 12, the opening created has a diameter that is at least as large as an internal diameter of the flange section.

In certain embodiments, the line of opening has a width that extends laterally across the transition region and onto at least a portion of the flange section 14 and/or the bulged section 12. Thus, the margins of the line of opening 28 are not bound to the transition region only. However, in certain embodiments the line of opening 28 must overlie the transition region 26 along the entire length of the line of opening. In still further embodiments, the line of opening 28 comprises a cut feature that may comprise a number of different geometries. For example, the cut feature may comprise a fillet edge or chamfered edge that overlies the transition region of the rupture disc.

Line of opening 28 may be formed by numerous methods known to those of skill in the art. Preferably, mechanical milling is used to remove the metal from the disc 10. An exemplary method of milling is described in detail in U.S. Pat. No. 8,333,212, which is incorporated by reference herein in its entirety. In certain embodiments, the mill is configured to engage the transition region at a 90° angle to produce a fillet edge cut feature. Moreover, the mill may remove disc material from the flange section 14 and/or the bulged section 12 in addition to the transition region so that the line of opening 28 extends laterally across the transition region. However, as indicated above, the line of opening 28 that is formed must overlie at least the transition region 26. In some embodiments, removal of the disc material from the transition region 26 comprises forming a chamfered edge in the transition region 26.

Alternatively, line of opening 28 may be formed by a laser milling operation, such as that described in U.S. Pat. No. 9,303,778, which is incorporated by reference herein in its entirety. Laser milling may be used to create any of the various stress-concentrating features described herein. In particular embodiments, whichever method is employed, the milling operation does not alter the underlying metal grain structure of the transition region 26. In contrast, conventional scoring operations involving the use of a die to displace, but not remove, metal within the rupture disc are not favored, and in some embodiments are avoided, as these scoring operations introduced further stresses into the disc material that may unpredictably alter disc burst characteristics. In certain embodiments of the present invention, line of opening 28 does not add stress to the disc material such as through a change in grain structure, but rather serves to concentrate or direct stress placed upon the disc material by a working fluid to the line of opening 28 and transition region 26, generally. By concentrating stress from the working fluid, rather than introducing additional stress into the metal itself, the burst characteristics of the disc are more predictable.

According to certain embodiments of the present invention, the rupture disc 10 is a forward-acting disc. This means that the rupture disc is configured to open when a fluid acting upon the concave face 20 of the bulged section 12 reaches a predetermined threshold. In other words, the disc 10 is not configured to open by causing the concavity of the bulged section 12 to reverse due to an overpressure acting upon the convex face 18, as would be the case with a reverse-acting disc. The line of opening 28 is the primary feature of disc 10, and in certain embodiments the only feature, that controls the burst pressure of the disc 10. In particular, the stress created through removal of disc material in the transition region 26 during formation of the line of opening 28 determines the pressure to which the disc must be exposed in order for the disc to open. This is in contrast with reverse-acting discs, such as those described in U.S. Pat. No. 9,303,778, in which it is undesirable for the line of opening to control burst pressure.

The rupture disc 10 illustrated in FIGS. 1-3 may be used in a number of applications but have particular usefulness in pressure relief devices for downhole operations. An example of one such pressure relief device 38 is illustrated in FIGS. 4-10. Pressure relief device 38 generally comprises a bulged, forward-acting rupture disc 10 that is positioned between an inlet ring 40 and an outlet ring 42. The illustrated pressure relief device 38 is particularly adapted for connection to a downhole casing string, although, other configurations and applications are contemplated and within the scope of the present invention. Inlet ring 40 is configured to abut the side of the rupture disc comprising concave face 20 and comprises an external, circumscribing wall 44, an internal wall 46, and a disc-contacting edge 48. External wall 44 may comprise channels or grooves 49 that are configured to receive radial seals, such as O-rings, so as to mate with other parts of a casing string within which pressure-relief device 38 is installed. In addition, the external wall 44 and internal wall 46 may each comprise a beveled segment 45 and 47, respectively.

Figure 4:
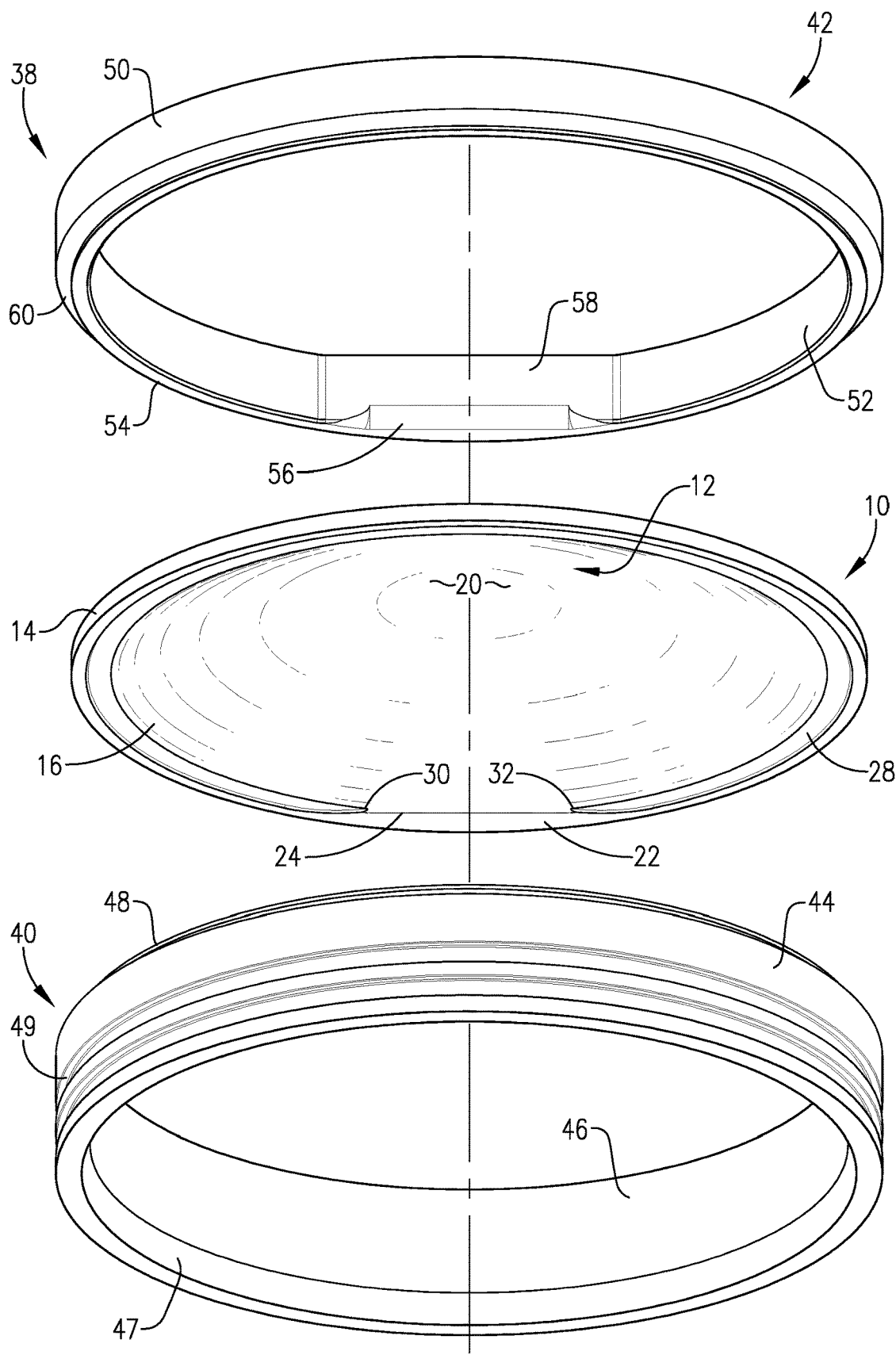
FIG. 4 is an expanded view of a pressure relief device in accordance with the present invention comprising an inlet ring, an outlet ring, and a rupture disc situated therebetween.
Figure 5:
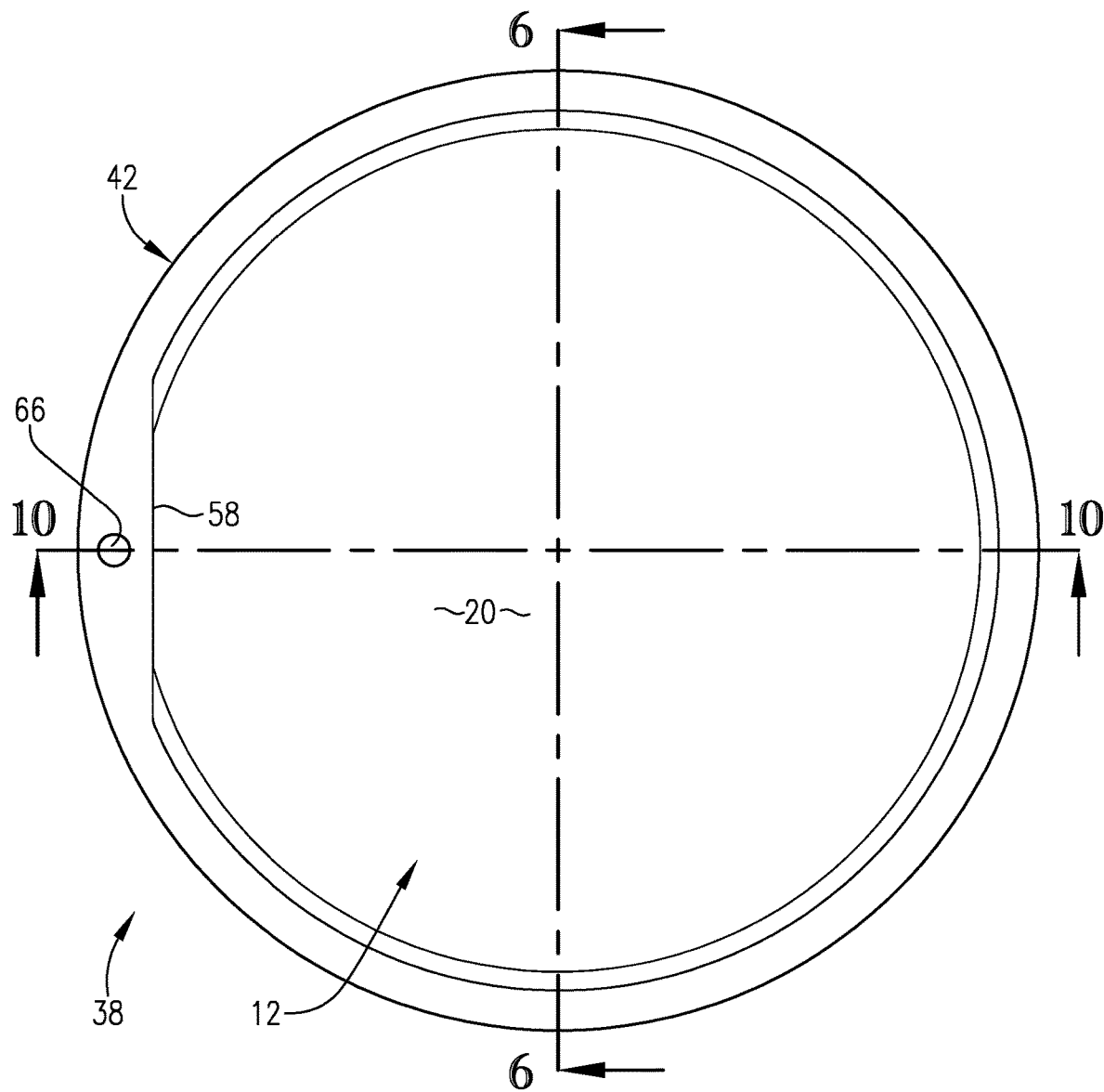
FIG. 5 is a plan view of the pressure relief device of FIG. 4 showing the outlet ring and underlying rupture disc.
Figure 6:
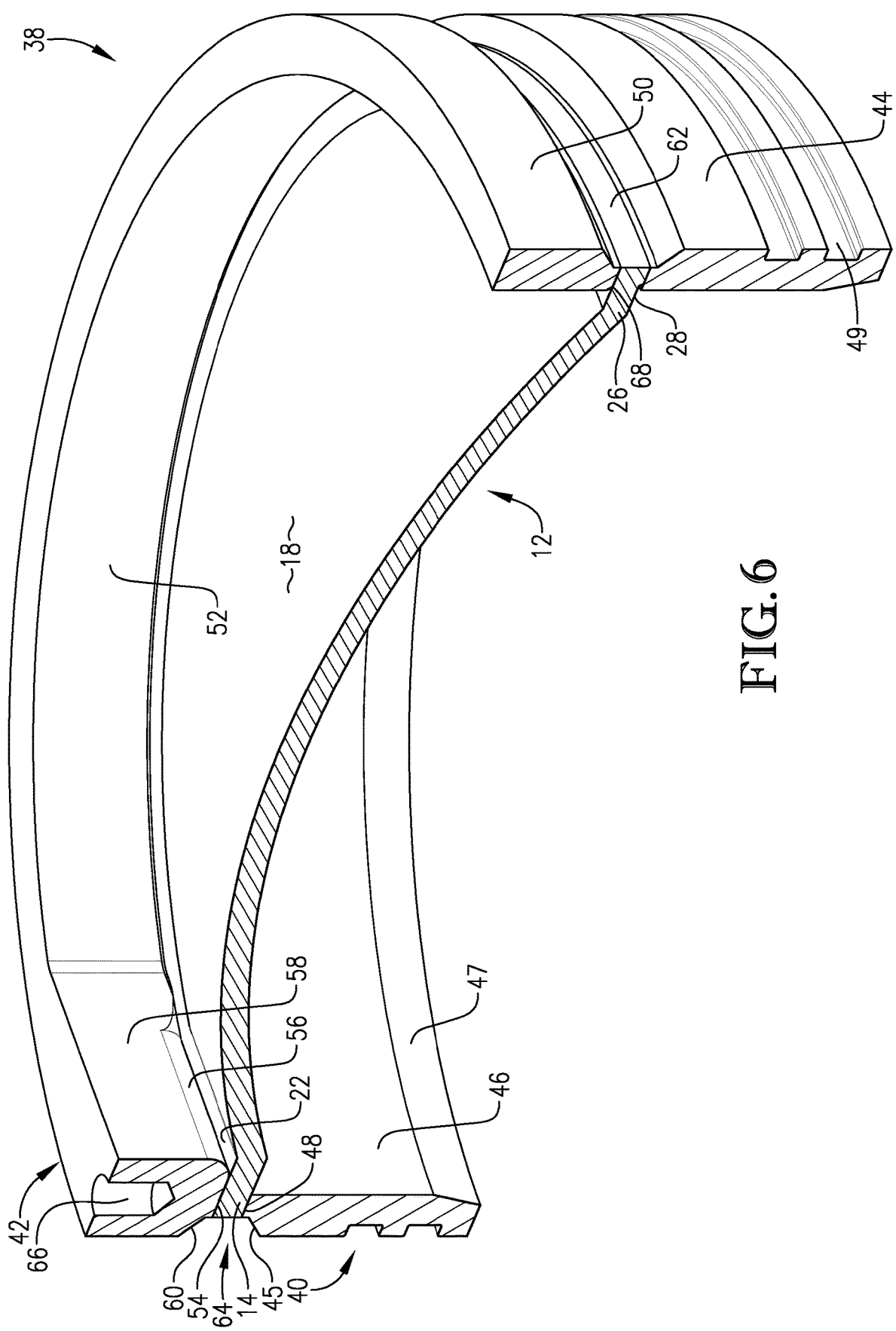
FIG. 6 is a cross-sectioned view of the pressure relief device taken along line 6-6 of FIG. 5.
Figure 9:
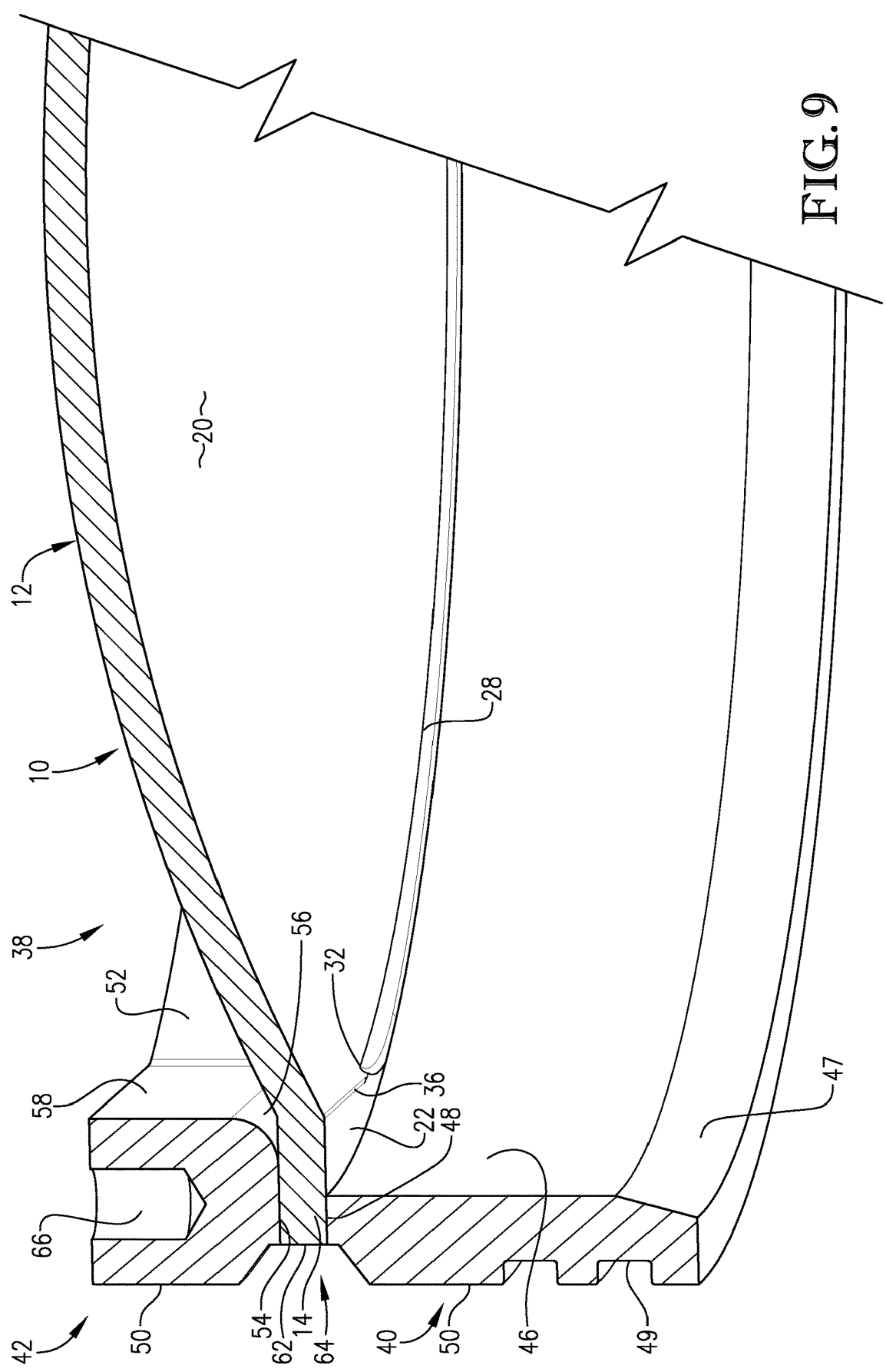
FIG. 9 is a close-up, sectioned view of the pressure relief device of FIG. 4 illustrating the transition region of the rupture disc from the concave face perspective.
Figure 10:
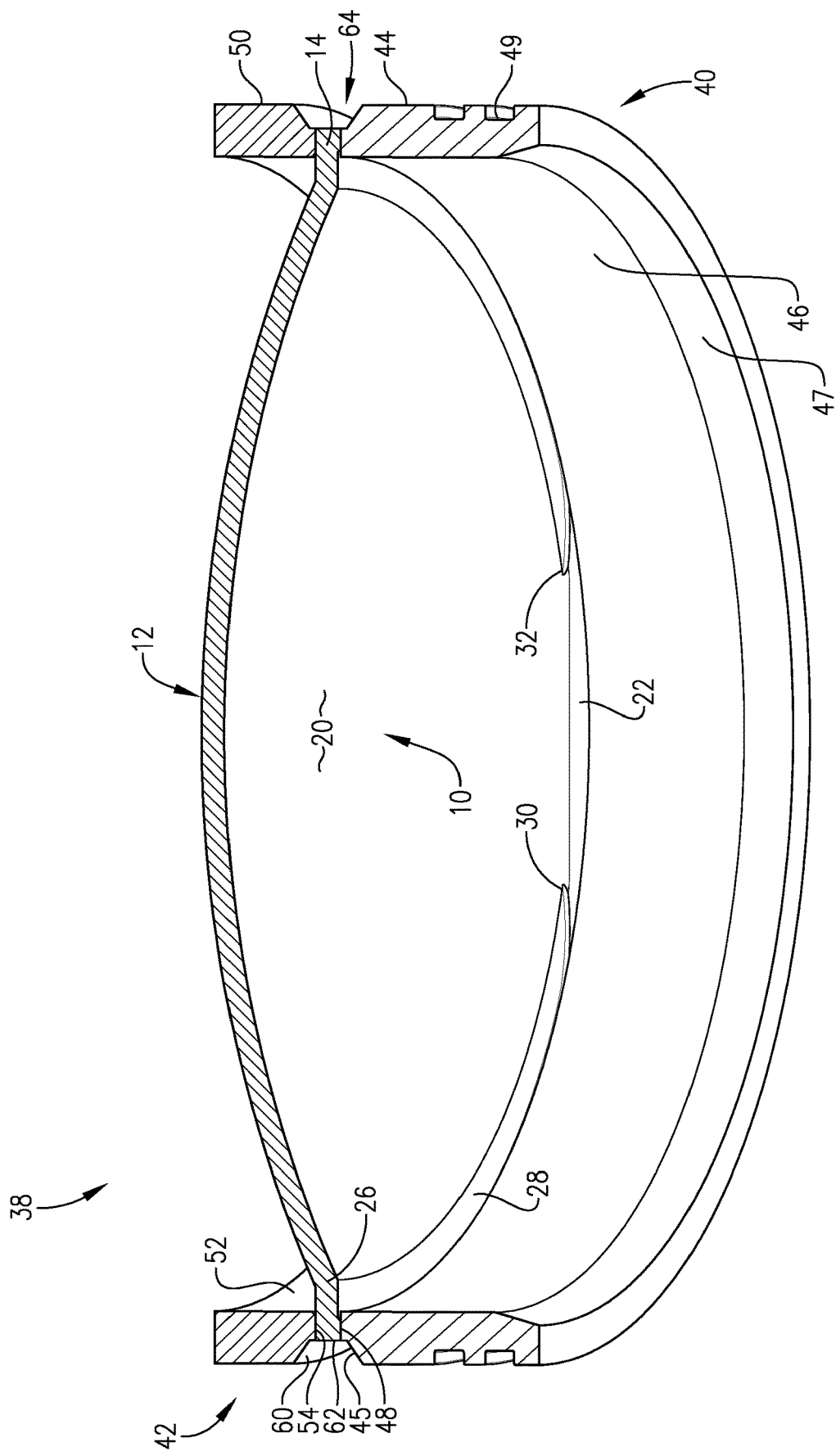
FIG. 10 is a cross-section view of the pressure relief device taken along line 10-10 of FIG. 5.

Outlet ring 42 is configured to abut the side of rupture disc 10 comprising convex face 18 and also comprises an external, circumscribing wall 50, an internal wall 52, and a disc-contacting edge 54. However, outlet ring 42 further comprises a hinge support 56 that is formed in the internal wall 52 and edge 54. As the petal of the disc pivots toward the outlet ring 52 upon opening of the disc, support 56 absorbs energy from the disc hinge section 22, which decelerates the hinge so as to prevent it from fragmenting. As can be seen in FIGS. 4, 6 and 9, for example, the hinge support 56 is at least partially formed within a wall segment 58, which forms a part of internal wall 52. Wall segment 58 comprises a flat surface, as opposed to the curved surface of the remainder of internal wall 52. Thus, the internal diameter (D) of outlet ring 42 is variable, with the smallest ID being measured from a point on hinge wall segment 58 to a point opposite the same on the curved surface of the internal wall 52, and with the largest ID being measured between any two opposite points on the curved surface of the internal wall 52. It is also within the scope of the present invention for support 56 and/or wall segment 58 to be omitted so that outlet ring 42 is substantially uniform in its configuration. External wall 50 also comprises a beveled segment 60, which cooperates with beveled segment 45 and a circumscribing rim 62 of rupture disc 10 to form a channel 64 into which a seal, such as an O-ring may be received. A bore 66 may also be formed within outlet ring 42, and in particular, within hinge support 56, that is configured to receive a pin or other fastener. In preferred embodiments, the rupture disc 10, and in particular the flange section 14, is welded to at least one of, and preferably both, inlet ring 40 and outlet ring 42. Alternatively, the inlet ring 40 and the outlet ring 42 could be secured together, with the rupture disc 10 therebetween, via a plurality of bolts extending through. Still further, inlet ring 40 and outlet ring 42 may be configured with corresponding male and female threading permitting the rings to be screwed together with the rupture disc 10 secured therebetween.

Rupture disc 10, when exposed to a fluid of a predetermined pressure acting against the concave face 20 of the dome 16, tears along the line of opening 28 thereby providing an opening through the disc that has a diameter that is at least as large as an internal diameter D. In certain embodiments, the line of opening 28 has a diameter that is greater than D to ensure that opening of the disc creates an opening through the disc that has a diameter that is at least as large as D.

In operation, being a forward-acting disc, rupture disc 10 is configured to hold a predetermined pressure in the forward direction (i.e., acting upon the concave face 20), and hold some portion of this pressure in the reverse direction (i.e., acting upon the convex face 18). Importantly, rupture disc 10, and in particular line of opening 28, is configured to break at a predetermined pressure and temperature. Opening of disc 10 preferably occurs along the inner diameter of outlet ring 42 to create a clear and unimpeded through bore within the casing string. Disc 10 should also be non-fragmenting in that the petal created upon opening is retained by hinge section 22. The thickness of the disc material that is located between line of opening 28 and a stress-intensifying edge 68 of outlet ring 42 controls the burst pressure of rupture disc 10. The stress-intensifying edge 68 may also be a chamfered edge.

In certain embodiments, pressure relief device 38 is installed into a casing string (not shown) to create an isolated portion of the string. When the isolated region is no longer desired, the fluid pressure on the inlet side of disc 10 is increased. As this inlet pressure is increased, the stress on the disc 10 is amplified at the location of the line of opening 28 (i.e., the stress concentration feature) and is further increased with the stress intensity feature 68 of the outlet ring 42. When the stress exceeds the material strength, a shear failure occurs on a line that connects these two features. The opening continues along this line throughout the entire line of opening 28, arresting at the endpoints 30, 32 of the line of opening 28, which is aligned with the hinge support 56. The disc 10 opens against the hinge support 56, creating an opening at the line of opening 28 that is at least the same as an inner diameter D of the outlet ring 42. In certain embodiments, if the disc fails to fully open, a mechanism (not shown) may be utilized to push the disc completely open.

We claim:

1. A bulged, forward-acting rupture disc comprising:
   a central bulged section comprising a concavo-convex dome;
   a flat, annular flange section surrounding the central bulged section;
   a transition region that is intermediate to and interconnects the central bulged section and the flange section; and
   a line of opening that overlies the transition region, the line of opening comprising an area in which material making up the rupture disc has been removed from the disc, without altering a metal grain structure in the transition region, thereby weakening the rupture disc such that when a pressure of a fluid acting upon a concave face of the dome reaches a predetermined threshold the rupture disc tears along the line of opening thereby providing an opening through the disc that has a diameter that is at least as large as an internal diameter of the flange section.

2. The rupture disc of claim 1, wherein the line of opening is C-shaped.

3. The rupture disc of claim 2, wherein the rupture disc further comprises a hinge section about which the central bulged section pivots upon tearing of the rupture disc along the line of opening, the hinge section being defined by a pair of end regions of the line of opening in which no material making up the rupture disc has been removed from the transition region.

4. The rupture disc of claim 1, wherein the dome is non-concentric.

5. The rupture disc of claim 1, wherein the line of opening extends laterally across the transition region and onto at least a portion of the flange section and/or the bulged central section.

6. A pressure relief device comprising:
   a bulged, forward-acting rupture disc that is secured between an inlet ring and an outlet ring,
   the rupture disc comprising—
      a central bulged section comprising a concavo-convex dome;
      a flat, annular flange section surrounding the central bulged section;
      a transition region that is intermediate to and interconnects the central bulged section and the flange section; and
      a line of opening that overlies the transition region, wherein the line of opening comprises an area in which material making up the rupture disc has been removed from the disc without altering a metal grain structure in the transition region,
   the inlet ring configured to abut the side of the rupture disc comprising a concave face of the dome,
   the outlet ring configured to abut the side of the rupture disc comprising a convex face of the dome and having an internal diameter D,
   the rupture disc, when exposed to a fluid of a predetermined pressure acting against the concave face of the dome, tears along the line of opening thereby providing an opening through the disc that has a diameter that is at least as large as D.

7. The pressure relief device of claim 6, wherein the line of opening is C-shaped.

8. The pressure relief device of claim 6, wherein the dome is non-concentric.

9. The pressure relief device of claim 6, wherein the line of opening extends laterally across the transition region and onto at least a portion of the flange section and/or the bulged central section.

10. The pressure relief device of claim 6, wherein the line of opening comprises a stress intensity feature that overlies the transition region of the rupture disc and is configured to focus stresses within the rupture disc onto the line of opening.

11. The pressure relief device of claim 10, wherein the stress intensity feature comprises a chamfered or a fillet edge.

12. The pressure relief device of claim 6, wherein the rupture disc further comprises a hinge region about which the central bulged section pivots upon tearing of the rupture disc along the line of opening, the hinge section being defined by a pair of end regions of the line of opening in which no material making up the rupture disc has been removed from the transition region.

13. The pressure relief device of claim 12, wherein the outlet ring comprises a hinge support that is configured to engage and support the hinge region upon opening of the rupture disc so as to prevent fragmentation of the bulged section.

14. The pressure relief device of claim 6, wherein the line of opening has a diameter that is greater than D.

15. The pressure relief device of claim 6, wherein the rupture disc is welded to at least one of the inlet and outlet rings.

16. The pressure relief device of claim 6, wherein the rupture disc is bolted in between the inlet and outlet rings.

17. The pressure relief device of claim 6, wherein the inlet and outlet rings are configured with corresponding male and female threading, and wherein the inlet and outlet rings are screwed together with the rupture disc secured therebetween.

18. The rupture disc of claim 1, wherein the line of opening is formed on the same side of the rupture disc as the concave face of the dome.

19. A bulged, forward-acting rupture disc comprising:
a central bulged section comprising a concavo-convex dome;
a flat, annular flange section surrounding the central bulged section;
a transition region that is intermediate to and interconnects the central bulged section and the flange section; and
a line of opening that overlies the transition region, the line of opening comprising an area in which material making up the rupture disc has been removed from the disc thereby weakening the rupture disc such that when a pressure of a fluid acting upon a concave face of the dome reaches a predetermined threshold the rupture disc tears along the line of opening thereby forming a petal, the portion of the petal that has detached from the flange section comprising at least a portion of the central bulged section and at least a portion of the transition region.

20. A bulged, forward-acting rupture disc comprising:
a central bulged section comprising a concavo-convex dome;
a flat, annular flange section surrounding the central bulged section;
a transition region that is intermediate to and interconnects the central bulged section and the flange section; and
a line of opening that overlies the transition region, the line of opening comprising an area in which material making up the rupture disc has been removed from the disc thereby weakening the rupture disc such that when a pressure of a fluid acting upon a concave face of the dome reaches a predetermined threshold the rupture disc tears along the line of opening thereby providing an opening through the disc that has a diameter that is at least as large as an internal diameter of the flange section,
such that when a pressure of a fluid acting upon a concave face of the dome reaches a predetermined threshold the rupture disc tears along the line of opening thereby providing an opening through the disc that has a diameter that is at least as large as an internal diameter of the flange section,
wherein the transition region comprises the thinnest portion of the rupture disc.

\* \* \* \* \*